(No Model.) 2 Sheets—Sheet 1.
R. B. BENJAMIN.
INCANDESCENT LAMP SOCKET.
No. 575,322. Patented Jan. 19, 1897.
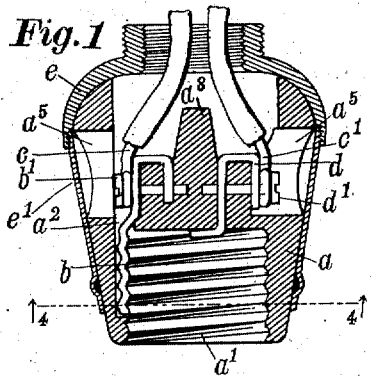
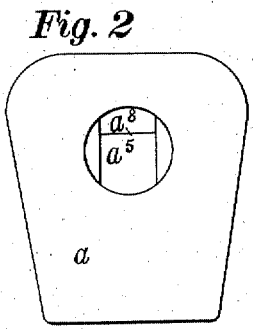
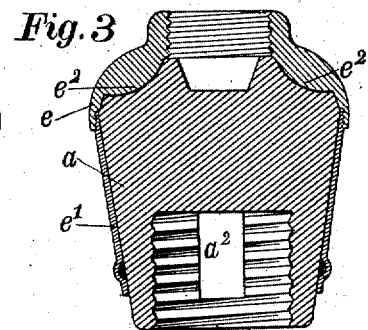
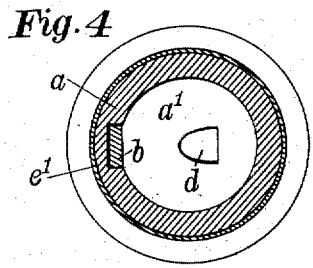
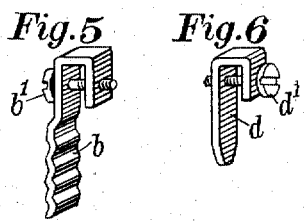
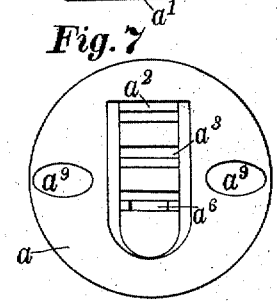
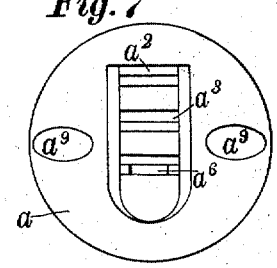
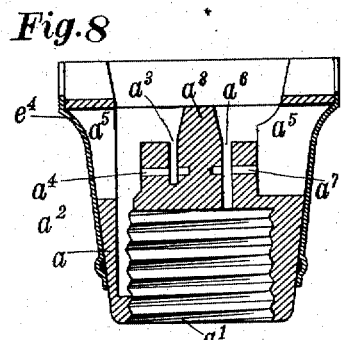
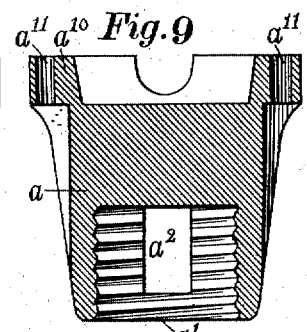
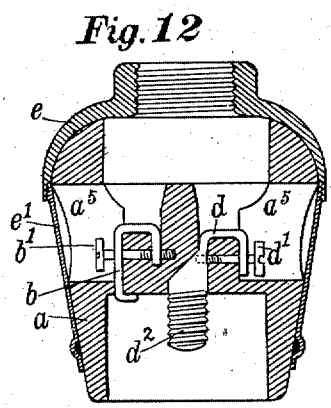
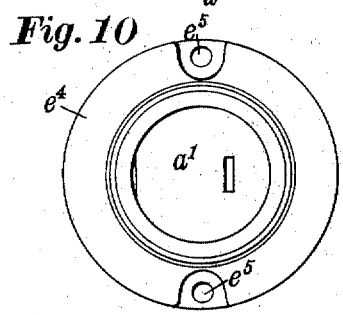
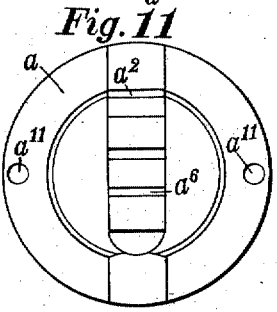
WITNESSES:
William M. Monyer
Blake B. Bell
INVENTOR:
Reuben B. Benjamin
BY W. Clyde Jones,
ATTORNEY.

(No Model.) 2 Sheets—Sheet 2.
R. B. BENJAMIN.
INCANDESCENT LAMP SOCKET.
No. 575,322. Patented Jan. 19, 1897.
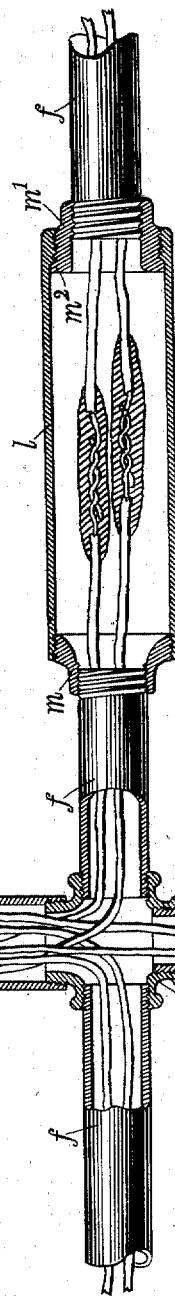
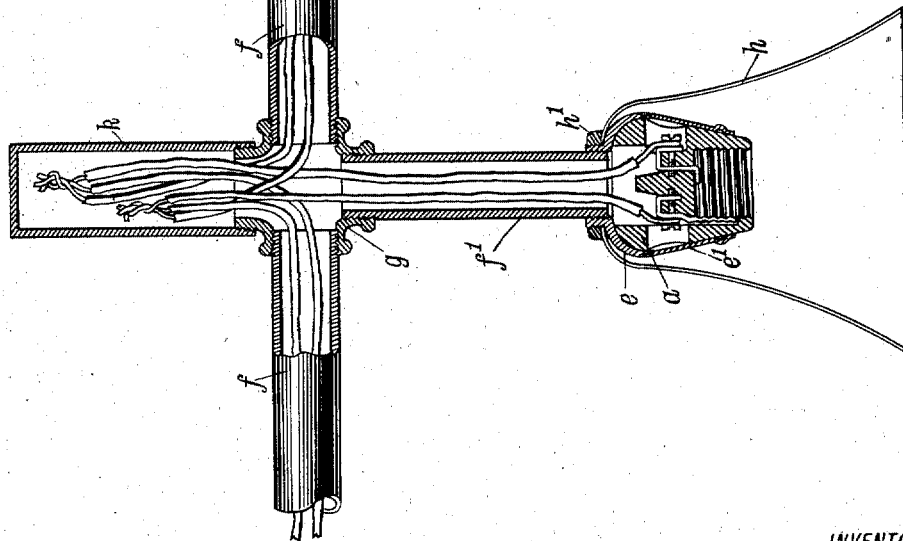
*Fig.13*
WITNESSES:
INVENTOR:
Reuben B. Benjamin
BY W. Clyde Jones
ATTORNEY.

UNITED STATES PATENT OFFICE.

REUBEN B. BENJAMIN, OF CHICAGO, ILLINOIS.

INCANDESCENT-LAMP SOCKET.

SPECIFICATION forming part of Letters Patent No. 575,322, dated January 19, 1897.

Application filed March 16, 1896. Serial No. 583,316. (No model.)

*To all whom it may concern:*

Be it known that I, REUBEN B. BENJAMIN, a citizen of the United States, residing at Chicago, in the county of Cook and State of Illinois, have invented a certain new and useful Improvement in Incandescent-Lamp Sockets, (Case No. 1,) of which the following is a full, clear, concise, and exact description, reference being had to the accompanying drawings, forming a part of this specification.

My invention relates to incandescent-lamp sockets; and its object is to provide an improved form of socket which shall afford perfect insulation, while being cheap of construction.

A further object of my invention is to produce a thoroughly-waterproof socket.

In accordance with my invention I provide a base of porcelain, provided with a recess in the end for the reception of the lamp-base, the walls of the recess being threaded for engagement with the threads upon the lamp-bases of the Edison type. A channel is provided upon one side of the recess, within which rests a spring plate or contact, forming one of the socket-terminals. The second terminal rests in the bottom of the recess and engages the end terminal upon the lamp-base. The contact-terminals are both in the form of plates adapted to pass through openings provided in the porcelain base and carry upon their upper ends binding-screws which rest in lateral recesses accessible from the sides of the lamp-base. The binding-screws also serve in the preferred construction to maintain the terminal plates in position. A wall or partition is provided between the two binding-posts, so that the bare conductors secured thereto are prevented from coming into contact. When it is desired to employ a lamp having a base of the Thomson-Houston type, the central terminal is made in the form of a threaded post, while the opposite terminal is arranged to engage the ring upon the lamp-base. A cover or casing is provided for the socket, which, when removed, permits access to the binding-screws.

My invention contemplates means for securing the socket to the conduit to produce a waterproof conduit and socket, and, further, an improved form of conduit provided with removable portions for permitting access to the joints or connections of the conductors within the conduit.

I have illustrated my invention in the accompanying drawings, in which—

Figure 1 is a sectional view of the socket of my invention. Fig. 2 is a view of the porcelain base. Fig. 3 is a sectional view of the base and casing or shell. Fig. 4 is a sectional view on the line 4 4, Fig. 1. Figs. 5 and 6 are detached views of the contact-terminals. Fig. 7 is a top view of the porcelain base. Fig. 8 is a sectional view of a wall-socket embodying my invention. Fig. 9 is a sectional view thereof on a plane at right angles to that of Fig. 8. Fig. 10 is a front view of the wall-socket. Fig. 11 is a rear view thereof. Fig. 12 is a sectional view of a socket provided with terminals adapted to receive a Thomson-Houston lamp-base. Fig. 13 is a sectional view of an iron conduit, showing the manner of securing the socket of my invention thereto to produce a water-tight system and illustrating the removable conduit-sections.

The porcelain base $a$ is provided in the end with a recess $a'$, carrying threads formed in the porcelain to receive the threads upon the lamp-base. Upon one side of the recess a channel $a^2$ is provided, within which rests a spring-plate $b$, which constitutes one terminal of the socket and is adapted when the lamp is screwed into the socket to press against the shell thereon. The plate $b$ is preferably made sinuous to conform to the threads upon the base, thus insuring good electrical contact.

The plate $b$ extends through an opening in the base $a$, and the end of the plate is bent and extends into a recess $a^3$. A binding-screw $b'$ passes through the body of the contact-plate and engages a tapped hole in the end portion of the plate, which end portion lies parallel to the body. The screw $b'$ passes through a hole $a^4$ in the base, and when screwed into position securely maintains the contact-plate in position, at the same time serving as a binding-screw, the electrical conductor $c$ being adapted to be clamped between the head of the binding-screw and the face of the contact-plate $b$. A lateral recess $a^5$ is provided in the side of base $a$, within which the binding-screw and the upper portion of the contact-plate rests, the binding-screw being thus accessible from the side of the base. A second contact-plate $d$ is provided, which passes downward through an opening $a^6$ in the base, the end being bent over to lie against the bottom of the recess in the end of the base and thus be in position to engage the end terminal upon the lamp-base.

The upper end of the contact-plate $d$ is bent to bring the end portion parallel to the body portion thereof, and a binding-screw $d'$ passes through a hole in the end portion of the plate and through a hole $a^7$ in the base and engages a tapped hole in the body portion of the contact-plate, the single screw thus serving the double function of holding the contact-plate in position and pressing the electrical conductor $c'$ into contact with the contact-plate. An upwardly-extending central wall or partition $a^8$ is provided upon the base which serves to separate the ends of the two conductors $c$ $c'$ and prevents the bared ends thereof from coming into contact.

Upon the exterior of the base $a$ is provided a casing or shell $e$, preferably of cast brass, to which is screwed a casing $e'$, preferably of thin spun brass, the two parts constituting a shell or casing for the base. The two parts of the shell are preferably screwed together.

The upper end of the base is rounded or spherical in form, while the lower portion is tapered, the socket when completed presenting a somewhat pear-shaped appearance. The casing $e'$ being tapered, it may be screwed up until it engages and presses the base firmly against the upper portion $e$ of the shell, the porcelain base being thus firmly locked in position within the shell and the shell securely fixed to the base without the employment of screws or other objectionable means of attachment.

The lower end of the shell $e$ preferably rests some distance from the end of the base, so that a surface of considerable length is provided between the shell $e'$ and the shell of the lamp-base when in position, and danger from short-circuiting or grounding is thus avoided. By the removal of the shell $e'$ access is afforded to the lateral recesses in the sides of the base, within which rest the binding-screws. The recesses are of considerable depth, so that there is no danger of the binding-screws or the bared ends of the conductors coming in contact with the shell.

Upon the interior of the shell or casting $e$ two lugs or projections $e^2$ $e^2$ are provided, which engage corresponding recesses $a^9$ $a^9$ in the base $a$ to prevent rotation of the base relatively to the casing.

In Figs. 8, 9, 10, and 11 I have illustrated my invention in the form of a wall-socket, the construction of the base being in all essential particulars like that of Fig. 1, except that the end is adapted to be secured to a wall or flat surface. A flange or rim $a^{10}$ is provided around the base, through which holes $a^{11}$ are provided for the passage of screws for securing the socket to the wall. The rim $a^{10}$ is cut away at diametrical points to permit the passage to the rear of the base of conductors lying against the wall. A shell $e^4$ is provided adapted to inclose the base and carrying holes $e^5$ $e^5$ for the passage of the screws securing the socket in position.

In Fig. 12 is illustrated a socket adapted to receive lamp-bases of the Thomson-Houston type. The central contact-plate is provided with a threaded post $d^2$, fitting a recess provided in the lamp-base, the recess being provided with an oblique or tapering wall, with which a corresponding wall upon the post engages, the post being thus wedged in position and maintained rigid. The flattened end of the post passes through an opening in the base and is secured in position in the same manner as in the form of socket first described. The opposite contact-plate $b$, instead of terminating in a resilient end, is provided with an end turned in and lying against the bottom of the recess in the base and in position to engage the ring upon the lamp-base.

In Fig. 13 I have illustrated an iron-clad conduit for the electrical conductors, to be employed in conjunction with the socket of my invention to make a thoroughly insulated and waterproof installation. The conduit is in the form of iron pipes $f$ $f$, secured together at the ends. At points where a lamp is to be located a four-way union $g$ is employed, to which the pipes $f$ $f$ are screwed to complete the main conduit. A pipe $f'$ is screwed into the union, and through this pipe the conductors extend to the socket. The upper shell $e$ of the casing is provided with interior threads adapted to engage the threaded end of the pipe $f'$, and a bell or shade $h$ fits over the socket and rests against the top thereof. A ring $h'$ screws upon a thread provided upon the exterior of the shell $e$ and is screwed against the end of the bell $h$ to lock the same in position. The screw-joints are preferably made with red lead, and an absolutely waterproof structure results, preventing the access of water to the interior of the socket.

The union $g$ is provided, preferably, with exterior threads upon one side, with which the cylinder or cap $k$ is adapted to engage. The cap $k$ is situated in line with pipe $f'$ and directly opposite the same, and the conductors may be lead from the socket to the interior of the cap $k$, and by the removal of the cap access may be gained to the conductors for making the joints or for the purpose of repair. By the employment of the removable cap $k$ the wiring of the socket is greatly facilitated.

It is necessary to make joints at intervals in the main conductors extending through the conduit, and it is also desirable to have the conductors in short lengths, as installation and repair are thereby facilitated. For this purpose I provide at intervals sleeves *l*, which may be removed to permit access to the interior of the conduit. Upon one of the pipes *f* is provided a bushing *m*, having exterior threads with which threads upon the interior of the sleeve *l* may engage. Upon the end of the adjoining pipe *f* a bushing *m'* is provided, which also has exterior threads to engage with threads upon the sleeve, and, in addition, carries a shoulder $m^2$, which limits the endwise movement of the sleeve. By unscrewing the sleeve the same may be moved to the right, and the conductors within may be exposed. In placing the sleeve in position it is screwed up until the shoulder $m^2$ is engaged, and the sleeve is thus maintained in position and constitutes a portion of the conduit.

Having described my invention, what I claim as new, and desire to secure by Letters Patent, is—

1. In an incandescent-lamp socket, the combination with a base of insulating material having a recess in the end for the reception of the lamp-base, threads being formed in the walls of said recess to engage the threads upon the lamp-base, of a contact plate or terminal fitting in a slot upon one side of said recess and carrying a binding-screw, said base being provided with a recess in the side within which said binding-screw rests, a contact plate or terminal in the bottom of said recess and carrying a binding-screw, said base being provided with a recess in the side within which said binding-screw rests, and a shell surrounding said base and exposing said recesses containing the binding-screws when removed, substantially as described.

2. In an incandescent-lamp socket, the combination with a base of insulating material having a recess in the end for the reception of the lamp-base and provided with recesses in the side, of a pair of contact-terminals situated in said end recess and carrying binding-screws, one in each of said side recesses, and a shell surrounding said base and exposing said side recesses containing the binding-screws when removed, substantially as described.

3. In an incandescent-lamp socket, the combination with a base of porcelain or equivalent insulating material provided with a recess in the end for the reception of the lamp-base, and with lateral recesses in the sides for the binding-posts, of a contact plate or terminal *b* passing through an opening in said base, the end of said terminal being bent into a position parallel with the body of the plate and extending into the recess $a^3$, binding-screw *b'* passing through a hole in the body of plate *b* and through a hole $a^4$ in the base and engaging a tapped hole in the end of the plate *b*, contact-terminal *d* passing through an opening in the base, and having its end bent into a position parallel with the body portion thereof, and binding-screw *d'* passing through a hole in the end of terminal *d* through a hole in the base and engaging a tapped hole in the body of the plate, substantially as described.

4. In an incandescent lamp, the combination with a base of insulating material, having an enlarged end and uniformly tapered toward the small end and being provided with a recess in the small end for the reception of the lamp-base, of a shell for said base formed in two parts, one of said parts fitting over the larger end, the other part having a uniform taper conforming to the taper of the base, said parts being provided with screw-threads to permit the screwing of the same together end to end and bring the tapering part of the shell into engagement with the tapering walls of the base to thus secure the base between the two parts of the shell, substantially as described.

5. In an incandescent-lamp socket, the combination with the tapering base *a* having a recess in the end and lateral openings or recesses in the sides, of the contact-terminals *b* and *d* provided in said base, the binding-screws *b'* and *d'* securing said terminals respectively in position the upper shell or casing *e'* fitting upon the end of said base, and the lower tapering shell *e'* screwing into the end of the shell *e*, substantially as and for the purpose set forth.

6. The combination with sections of a main-line conduit placed with their ends at a distance apart, of electrical conductors situated within said conduits and joined together the joints lying in the space between the ends of said conduits, each of said conduits being provided with a threaded end, and a longitudinally-movable sleeve provided with threads adapted to engage the threaded ends of said conduits and with a shoulder or stop at one end to limit the longitudinal movement of the same, whereby by unscrewing said sleeve and moving the same longitudinally access may be had to the joints of the conductors, substantially as described.

7. In a conduit, the combination with the pipes *f*, *f*, of the bushings *m m'* mounted upon the ends of said pipes, and the sleeve *l* screwing upon said bushings, one of said bushings *m'* being provided with a shoulder $m^2$ to limit the longitudinal movement of the sleeve, substantially as described.

8. The combination with a pipe or conduit having a threaded end, of a socket having a casing screwing upon said threaded end, a bell or shade fitting over the end of said casing, the end of said casing being provided with a thread upon the exterior, and a ring or nut screwing upon said exterior thread and against the shade, to hold the same in position, substantially as described.

9. In an incandescent-lamp socket, the combination with a metallic shell or casing, of a base of insulating material provided in the end with a recess for the reception of the lamp-base, and inclosed within said shell, said base being made in one piece with the end thereof extending some distance beyond the end of the shell whereby an insulating-partition is interposed between the shell and the lamp-base and an insulating-surface of considerable length is interposed between the lamp-base and the end of the shell, substantially as described.

In witness whereof I hereunto subscribe my name this 7th day of March, A. D. 1896.

REUBEN B. BENJAMIN.

Witnesses:
J. ELLIOTT JENNINGS,
W. CLYDE JONES.